US008718953B2

(12) United States Patent
Rajagopalan et al.

(10) Patent No.: US 8,718,953 B2
(45) Date of Patent: May 6, 2014

(54) SYSTEM AND METHOD FOR MONITORING HEALTH OF AIRFOILS

(75) Inventors: Venkatesh Rajagopalan, Bangalore (IN); Vivek Venugopal Badami, Schenectady, NY (US); Rahul Srinivas Prabhu, Bangalore (IN); Ajay Kumar Behera, Bangalore (IN); Aninda Bhattacharya, Bangalore (IN)

(73) Assignee: General Electric Company, Niskayuna, NY (US)

( * ) Notice: Subject to any disclaimer, the term of this patent is extended or adjusted under 35 U.S.C. 154(b) by 219 days.

(21) Appl. No.: 13/096,244

(22) Filed: Apr. 28, 2011

(65) Prior Publication Data

US 2012/0278004 A1 Nov. 1, 2012

(51) Int. Cl.
*G01B 5/28* (2006.01)

(52) U.S. Cl.
USPC .............................. 702/39; 702/35; 73/112.01

(58) Field of Classification Search
USPC ................ 702/39, 34, 35, 85, 184; 73/112.01
See application file for complete search history.

(56) References Cited

U.S. PATENT DOCUMENTS 7,027,953 B2 4/2006 Klein
7,424,823 B2 * 9/2008 Teolis et al. ................ 73/112.01
2005/0171736 A1 8/2005 Kang
2006/0120197 A1 * 6/2006 Teolis et al. ................... 365/226
2008/0034753 A1 * 2/2008 Furman et al. ............... 60/605.1
2009/0092491 A1 4/2009 Cairo et al.
2010/0076698 A1 * 3/2010 He et al. .......................... 702/35
2010/0161245 A1 6/2010 Rai et al.
2011/0010108 A1 1/2011 Bhattacharya et al.

OTHER PUBLICATIONS

P. Jorgensen, "Choosing Discrete Orthogonal Waveltes for Signal Analysis and Approximation", 1993, IEEE, vol. 3, p. 308-311.*
Rajagopalan et al.; "System and Method for Monitoring Health of Airfoils"; Pending U.S. Appl. No. 12/825,763, filed Jun. 29, 2010; 34 Pages.
Rajagopalan et al.; "System and Method for Monitoring Health of Airfoils"; Pending U.S. Appl. No. 12/825,895, filed Jun. 29, 2010; 37 Pages.

* cited by examiner

*Primary Examiner* — John Breene
*Assistant Examiner* — Stephanie Bloss
(74) *Attorney, Agent, or Firm* — Scott J. Asmus

(57) ABSTRACT

A method for monitoring the health of one or more blades is presented. The method includes the steps of generating a signal representative of delta times of arrival corresponding to the rotating blade, generating a reconstructed signal by decomposing the signal representative of the delta times of arrival utilizing a multi-resolution analysis technique, wherein the reconstructed signal is representative of at least one of static deflection and dynamic deflection in the rotating blade.

17 Claims, 5 Drawing Sheets

SYSTEM AND METHOD FOR MONITORING HEALTH OF AIRFOILS

BACKGROUND

Embodiments of the disclosure relate generally to systems and methods for monitoring health of rotor blades or airfoils.

Rotor blades or airfoils play a crucial role in many devices with several examples, such as, axial compressors, turbines, engines and turbo-machines. For example, an axial compressor typically has a series of stages with each stage comprising a row of rotor blades followed by a row of static blades. Accordingly, each stage generally comprises a pair of rotor blades and static blades. As an illustrative axial compressor example, the rotor blades increase the kinetic energy of a fluid that enters the axial compressor through an inlet. Furthermore, the static blades generally convert the increased kinetic energy of the fluid into static pressure through diffusion. Accordingly, the rotor blades and static blades play an important role to increase the pressure of the fluid.

The rotor blades and the static blades (hereinafter "blades") are used in wide and varied applications of the axial compressors that include the blades. Axial compressors, for example, may be used in a number of applications, such as, land based gas turbines, jet engines, high speed ship engines, small scale power stations, and the like. In addition, the axial compressors may be used in varied applications, such as, large volume air separation plants, blast furnace air, fluid catalytic cracking air, propane dehydrogenation, and the like.

The blades operate for long hours under extreme and varied operating conditions such as, high speed, pressure and temperature that effect the health of the blades. In addition to the extreme and varied conditions, certain other factors lead to fatigue and stress of the blades. This may include factors, such as, inertial forces including centrifugal force, pressure, resonant frequencies of the blades, vibrations in the blades, vibratory stresses, temperature stresses, reseating of the blades, and load of the gas or other fluids. A prolonged increase in stress and fatigue over a period of time leads to defects and cracks in the blades. Furthermore, one or more of the cracks may widen or otherwise worsen with time to result in a liberation of a blade or a portion of the blade. The liberation of the blade may be hazardous for the device resulting in the failure of the device and significant cost. In addition, it may create an unsafe environment for people near the device and result in serious injuries.

Accordingly, it is highly desirable to develop a system and method that detects the health of rotor blades in real time. More particularly, it is desirable to develop a system and method that predicts cracks or fractures.

BRIEF DESCRIPTION

Briefly in accordance with one aspect of the technique, a method for monitoring the health of one or more blades is presented. The method includes the steps of generating a signal representative of delta times of arrival corresponding to the rotating blade, generating a reconstructed signal by decomposing the signal representative of the delta times of arrival utilizing a multi-resolution analysis technique, wherein the reconstructed signal is representative of at least one of static deflection and dynamic deflection in the rotating blade.

In accordance with an aspect of the present technique, a method for monitoring the health of a rotating blade is presented. The method includes the steps of generating a signal representative of filtered delta times of arrival corresponding to the rotating blade, selecting an appropriate wavelet based upon the signal representative of the filtered delta times TOAs and a decomposition level, decomposing the signal representative of the filtered delta times of arrival utilizing a multi-resolution analysis technique and the appropriate wavelet until the decomposition level is achieved to generate approximation coefficients and detailed coefficients; and generating a reconstructed signal utilizing the approximation coefficients, wherein the reconstructed signal is representative of static deflection in the rotating blade.

In accordance with one aspect, a system is presented. The system includes a processing subsystem that generates a signal representative of delta times of arrival corresponding to a rotating blade based upon actual times of arrival of the rotating blade, selects an appropriate wavelet based upon the signal representative of the delta times of arrival and a decomposition level, decomposes the signal representative of the delta times of arrival utilizing a multi-resolution analysis technique and the appropriate wavelet until the decomposition level is achieved to generate approximation coefficients and detailed coefficients, and generates a reconstructed signal utilizing the approximation coefficients, wherein the reconstructed signal is representative of static deflection in the rotating blade.

In accordance with another aspect, a non-transitory computer readable medium for a blade health monitoring system encoded with a program to instruct a computer is presented. The computer generates a signal representative of delta times of arrival corresponding to the plurality of rotating blades, selects an appropriate wavelet based upon the signal representative of the delta times of arrival and a decomposition level, decomposes the signal representative of the delta times of arrival utilizing a multi-resolution analysis technique and the appropriate wavelet until the decomposition level is achieved to generate approximation coefficients and detailed coefficients, and generates a reconstructed signal utilizing the approximation coefficients, wherein the reconstructed signal is representative of at least one of static deflection and dynamic deflection in the plurality of rotating blades.

DRAWINGS

These and other features, aspects, and advantages of the present system will become better understood when the following detailed description is read with reference to the accompanying drawings in which like characters represent like parts throughout the drawings, wherein.

DETAILED DESCRIPTION

As discussed in detail herein, embodiments of the present system and techniques evaluate the health of one or more rotating blades or airfoils. Hereinafter, the terms “airfoils,” “rotating blades” and “blades” will be used interchangeably. More particularly, the present system and techniques determine static deflection in the blades due to conditions, such as, one or more defects or cracks in the blades. As used herein, the term “static deflection” may be used to refer to a deflection in the position of a blade from the expected or original position of the blade. Certain embodiments of the present system and techniques also determine dynamic deflection corresponding to the blades. As used herein, the term, “dynamic deflection” may be used to refer to an amplitude of vibration of a blade over the mean position of the blade.

Figure 1:
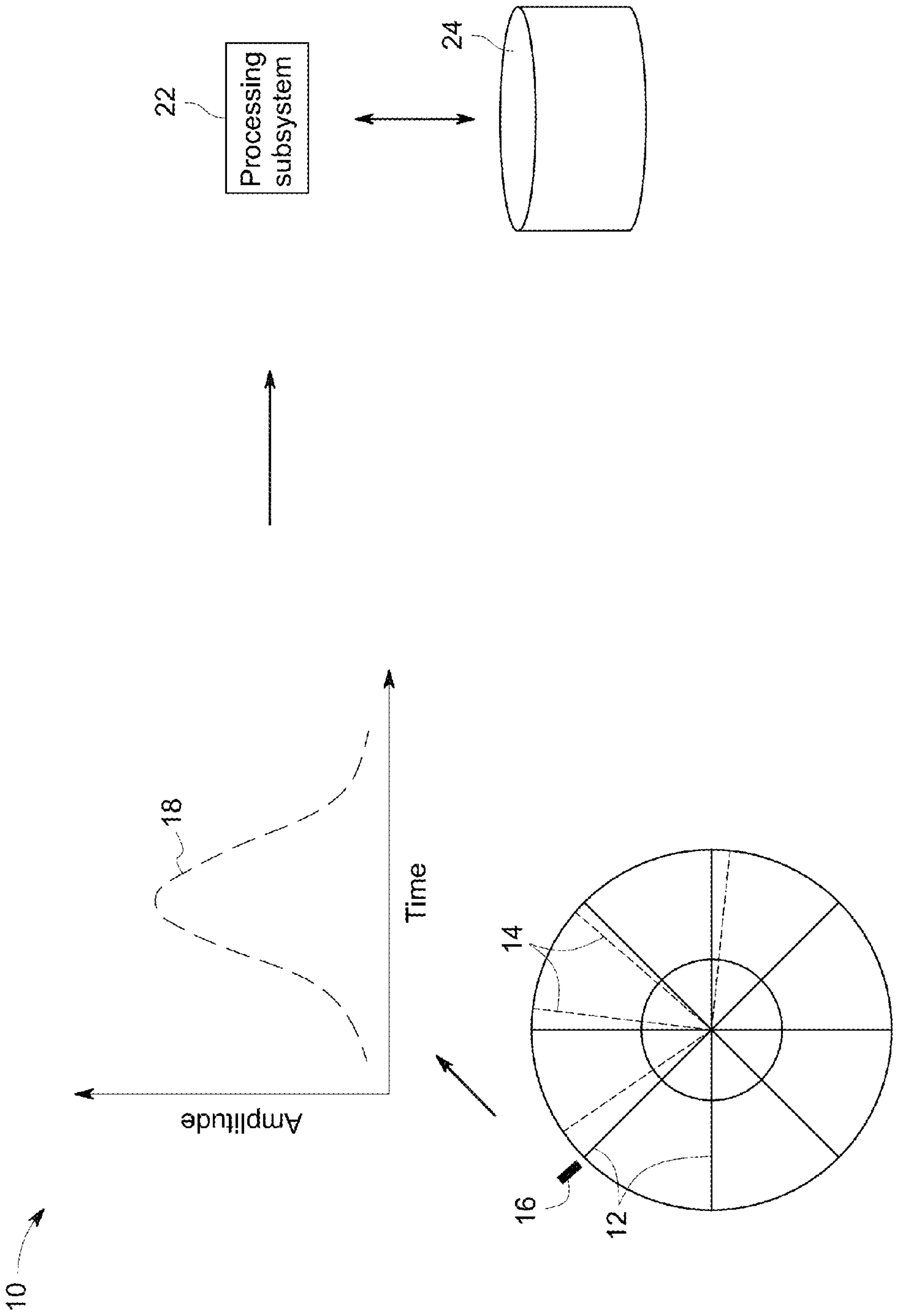
FIG. 1 is an exemplary diagrammatic illustration of a blade health monitoring system, in accordance with an embodiment of the present system.

In operation, a time of arrival (TOA) of blades at a reference position after each rotation may vary from an expected TOA due to factors, such as, one or more cracks or defects in the blades. Hereinafter, the word “TOA” and the term “actual TOA” will be used interchangeably. The variation in the TOA of the blades is used to determine the static deflection and/or dynamic deflection in the rotating blades. As used herein, the term “expected TOA” may be used to refer to a predicted or expected TOA of a blade at a reference position after each rotation when there are no or insignificant defects or cracks in the blade and the blade is working properly, such as, in an ideal situation, load conditions are optimal, and the vibrations in the blade are minimal FIG. 1 is a diagrammatic illustration of a rotor blade health monitoring system 10, in accordance with an embodiment of the present system. As shown in FIG. 1, the system 10 includes one or more rotating blades 12. As shown by dotted lines 14, the blades 12 may have static deflection or dynamic deflection. Therefore, the blades 12 are monitored by the system 10 to determine at least one of the static deflection and dynamic deflection in the blades 12. As shown in the presently contemplated configuration, the system 10 includes one or more sensors 16. The sensor 16 generates TOA signals 18 that are representative of actual TOAs of the blades 12 at a reference point for a determined time period. In one embodiment, the sensor 16 sense an arrival of the one or more blades 12 at the reference point to generate the TOA signals 18. The reference point, for example, may be underneath the sensor 16 or adjacent to the sensor 16. In an embodiment, each of the TOA signals 18 is sampled and/or measured for a particular time period and is used for determining the actual TOAs of the blades 12. It may be noted that the delta TOA is measured in in units of time or degrees.

In one embodiment, the units of the delta TOA corresponding to each of the one or more blades may be converted in to units of mils For example, the delta TOA corresponding to each of the one or more blades that is in units of degrees may be converted in to units of mils using the following equation (1):

$$\Delta ToA_{mils(k)}(t) = \frac{2\pi R \times \Delta ToA_{Deg(k)}(t)}{360} \qquad (1)$$

where $\Delta ToA_{mils(k)}(t)$ is a delta TOA of a blade k at a t instant of time and the delta TOA is in units of mils, $\Delta ToA_{Deg(k)}(t)$ is a delta TOA of the blade k at the t instant of time and the delta TOA is in units of degrees and, R is a radius of a blade from the center of a rotor of the blade. The radius R is in units of mils. In another embodiment, the delta TOA that is in units of seconds may be converted in to units of mils using the following equation (2):

$$\Delta ToA_{mils(k)}(t) = \frac{2\pi R \times N \times \Delta ToA_{sec(k)}(t)}{60} \qquad (2)$$

where $\Delta ToA_{mils(k)}(t)$ is a delta TOA of a blade k at a t instant of time and the delta TOA is in units of mils, $\Delta ToA_{sec(k)}(t)$) is a delta TOA of the blade k at the t instant of time and the delta TOA is in units of degrees and R is a radius of a blade from the center of a rotor of the blade. The radius R is in units of mils and N is the speed in rpm.

In one embodiment, the sensor 16 may sense an arrival of the leading edge of the blades 12 to generate the TOA signals 18. In another embodiment, the sensor 16 may sense an arrival of the trailing edge of the one or more blades 12 to generate the signals 18. The sensor 16, for example, may be mounted adjacent to the one or more blades 12 on a stationary object in a position such that an arrival of each of the blades 12 may be sensed efficiently. In one embodiment, the sensor 16 is mounted on a casing (not shown) of the blades 12. By way of a non-limiting example, the sensor 16 may be magnetic sensors, capacitive sensors, eddy current sensors, or the like. In a further example, the sensor 16 is a proximity sensor that is deployed on or proximate the casing (not shown) around the rotor. Such proximity sensor may be situated in the system 10 in a pre-existing design such that the present system 10 requires no additional sensor deployment.

As illustrated in the presently contemplated configuration, the TOA signals 18 are received by a processing subsystem 22. The processing subsystem 22 determines actual TOAs of the blades 12 based upon the TOA signals 18. Furthermore, the processing subsystem 22 determines at least one of static deflection and dynamic deflection in the blades 12 based upon the actual times of arrival (TOAs) of the blades 12. The determination of the static deflection and/or dynamic deflection will be explained in greater detail with reference to FIGS. 2-4. In one embodiment, the processing subsystem 22 may have a data repository 24 that stores data, such as, static deflection, dynamic deflection, TOAs, delta TOAs, any intermediate data, or the like.

Figure 2:
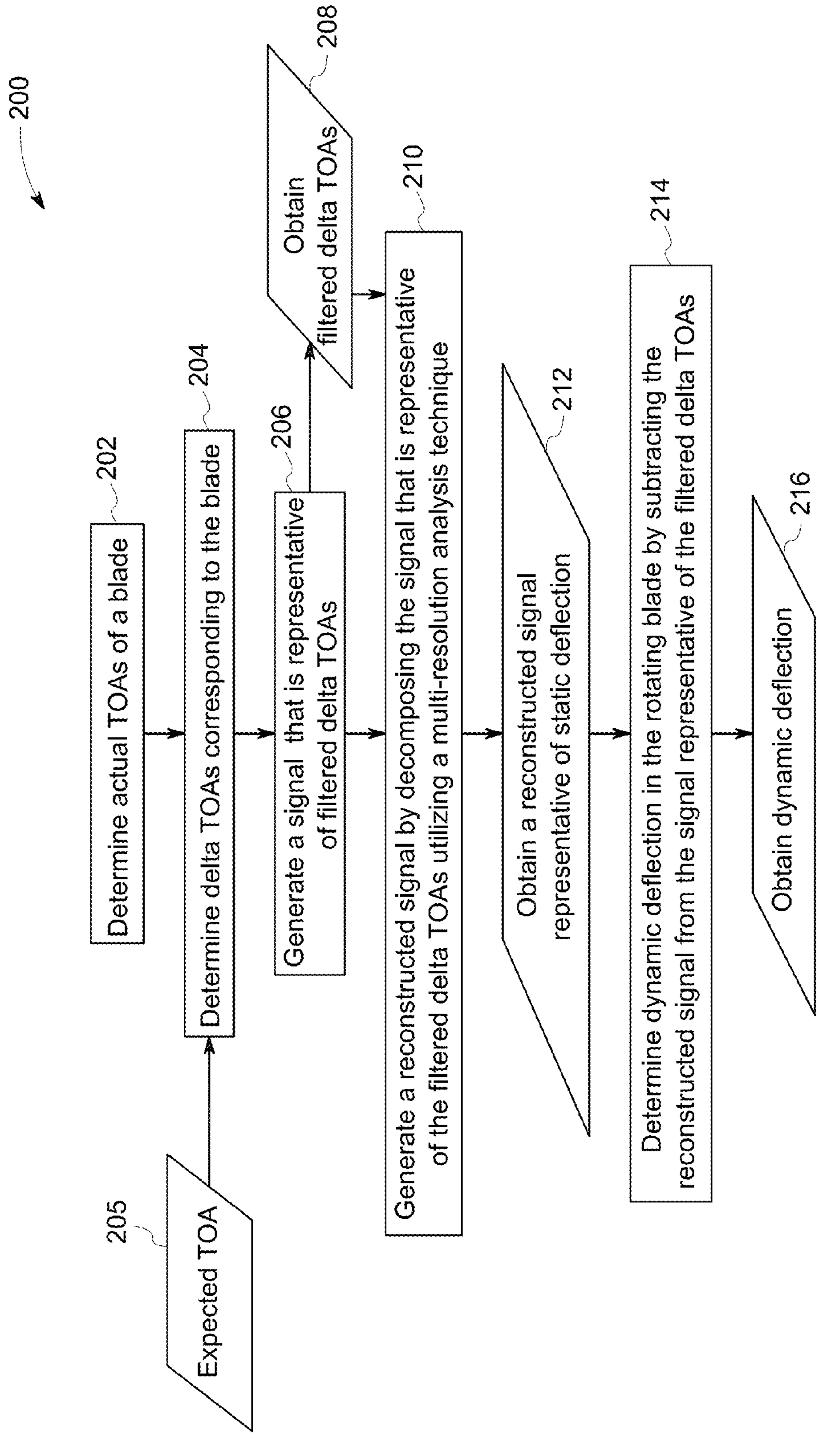
FIG. 2 is a flow chart representing an exemplary method for determining static deflection and dynamic deflection of a blade, in accordance with an embodiment of the present techniques.

Referring now to FIG. 2, a flowchart representing an exemplary method 200 for determining static deflection and dynamic deflection in blades, in accordance with an embodiment of the invention, is depicted. For ease of understanding the exemplary method 200 will be explained with reference to a single blade. The blade, for example, may be one of the blades 12 (see FIG. 1). The method 200 is depicted by steps 202-216. At step 202, actual TOAs may be determined by a processing subsystem, such as, the processing subsystem 22 (see FIG. 1). As previously noted with reference to FIG. 1, the actual TOAs in one example is determined based upon the TOA signals 18 (see FIG. 1).

Figure 5:
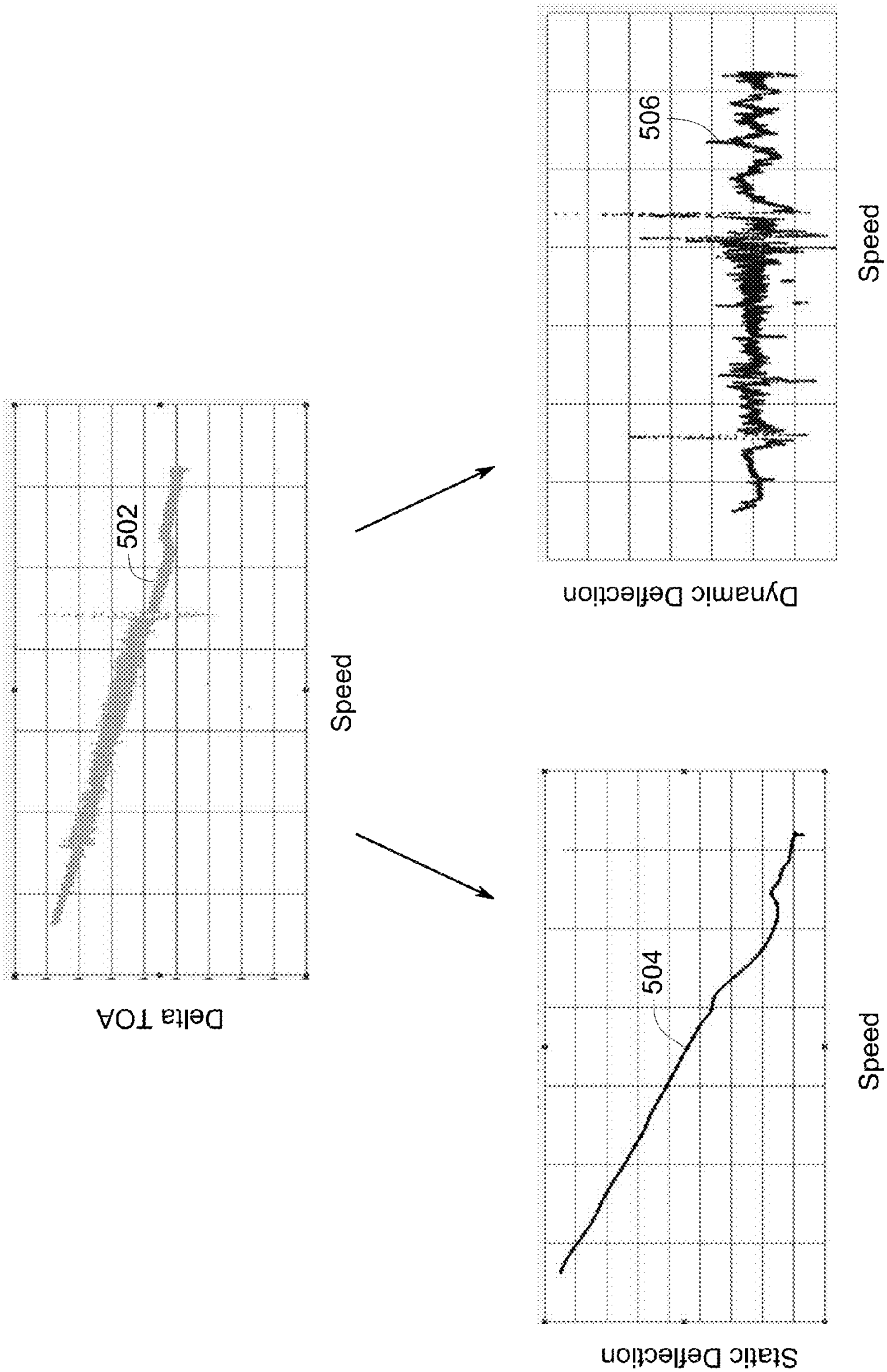
FIG. 5 is a graphical representation of exemplary delta times of arrival, static deflection and dynamic deflection generated utilizing actual data, in accordance with one embodiment.

At step 204, delta TOAs corresponding to the blade are determined. A delta TOA corresponding to a blade, for example, may be a difference of an actual TOA corresponding to the blade that is received at step 202 and an expected TOA 205 corresponding to the blade. It may be noted that the delta TOA corresponding to the blade is representative of a variation in the actual TOA of the blade in comparison to the expected TOA 205 of the blade at a time instant. The delta TOA, for example, may be determined using the following equation (3):

$$\Delta TOA_k(t) = TOA_{act(k)}(t) - TOA_{exp(k)} \qquad (3)$$

where $\Delta TOA_k(t)$ is a delta TOA corresponding to a blade k at a time instant t or a variation from the expected TOA corresponding to the blade k at the time instant t, $TOA_{act(k)}$ is an actual TOA corresponding to the blade k at the time instant t, and $TOA_{exp(k)}$ is an expected TOA corresponding to the blade k. FIG. 5 shows exemplary delta times of arrival (TOAs) profile 502 wherein delta times of arrival are shown via. Y-axis, and speed of a device that includes the blades 12 are shown via. X-axis.

As used herein, the term "expected TOA" may be used to refer to an actual TOA of a blade at a reference position when there are no or insignificant defects, cracks, or other errors in the blade, and the blade is working in an operational state when effects of operational data on the actual TOA are minimal In one example, such expected TOA can be based on simulation data. In one embodiment, the expected TOA 205 corresponding to the blade may be determined by equating an actual TOA corresponding to the blade to the expected TOA 205 of the blade when a device that includes the blade has been recently commissioned, bought, or otherwise verified as healthy, including data from the manufacturing initialization. Such a determination assumes that since the device has been recently commissioned, bought, or otherwise been verified as healthy, all blades in the device are working in an ideal situation, the load conditions are optimal, and the vibrations in the blade are minimal In another embodiment, the expected TOA 205 may be determined by determining an average of actual times of arrival (TOAs) of the blades in the device. The device, for example, may include axial compressors, land based gas turbines, jet engines, high speed ship engines, small scale power stations, or the like.

In one embodiment, at step 206, a signal may be generated that is representative of filtered delta TOAs 208 corresponding to the blade. The signal representative of the filtered delta TOAs, for example, may be generated by filtering the delta TOAs that have been determined at step 204. For example, the delta TOAs may be filtered using one or more filtering techniques including a Savitzky-Golay technique, a median filtering technique, or combinations thereof. The delta TOA or the filtered delta TOA may comprise of static deflection and dynamic deflection. The static deflection may be considered as a slowly evolving long term trend while the dynamic deflection represents the short-term dynamics of the blade vibration. In other words, the static and the dynamic deflection may be considered as the low and high pass frequency components of the delta TOA or the filtered delta TOA, respectively. Wavelet analysis presents a powerful tool for separating the static deflection and dynamic deflection present in delta TOA or filtered delta TOA. Given the flexibility of choosing scales in wavelet decomposition, the required information may be compressed into one or more levels (indicated by the scale) in the multi-resolution analysis and this information alone may be reconstructed. For e.g., a low pass frequency component of a signal may be obtained through multi-resolution analysis performed to a high scale value. Further, a wavelet could also be used for extracting varying frequency (band-pass) information from a signal without the need for designing new filters.

Subsequently at step 210, a reconstructed signal 212 in one example is generated by decomposing the signal that is representative of the filtered delta TOAs 208. In another example, the reconstructed signal 212 is generated by decomposing the signal that is representative of the delta TOAs. The signal that is representative of filtered delta TOAs 208 or the delta TOAs may be decomposed into static deflection and dynamic deflection utilizing a multi-resolution analysis technique. The reconstructed signal 212, for example, in one example is generated by the processing subsystem 22 (see FIG. 1). It is noted that the reconstructed signal 212 is representative of static deflection in the blade. FIG. 5 shows an exemplary static deflection profile 504 wherein the static deflection is shown via. Y-axis, and speed of a device that includes the blades 12 is shown via. X-axis. As shown in FIG. 5, the static deflection profile 504 is obtained by processing the delta TOA profile 502. The generation of the reconstructed signal 212 utilizing the multi-resolution analysis technique will be explained in greater detail with reference to FIG. 3. Additionally, the multi-resolution analysis technique will be explained with reference to FIG. 4.

In one embodiment, at step 214, dynamic deflection 216 in the blade is determined The dynamic deflection 216 in the blade in one example is determined by subtracting the signal representative of the filtered delta TOAs 208 from the reconstructed signal 212. Particularly, the dynamic deflection 216 may be determined by subtracting a filtered delta TOA from respective static deflection. The dynamic deflection 216, for example, is determined using the following equations (4) and (5):

$$\text{Dynamic\_Deflection}_k(t)=\text{Filtered}\Delta TOA_k(t)-\text{Stat\_def}_k(t) \quad (4)$$

$$\text{Dynamic\_Deflection}_k(t)=\Delta TOA_k(t)-\text{Stat\_def}_k(t) \quad (5)$$

where $\text{Dynamic\_Deflection}_k(t)$ is a dynamic deflection of a blade k at a time instant t, $\text{Filtered}\Delta TOA_k(t)$ is a filtered delta TOA of the blade k at the time instant t, $\Delta TOA_k(t)$ is a delta TOA of the blade k at the time instant t, and $\text{Stat\_def}_k(t)$ is a static deflection in the blade k at the time instant t. FIG. 5 shows an exemplary dynamic deflection profile 506 wherein the dynamic deflection is shown via. Y-axis, and speed of a device that includes the blades 12 is shown via X-axis. As shown in FIG. 5, the dynamic deflection profile 506 is obtained by processing the delta TOA profile 502.

Figure 3:
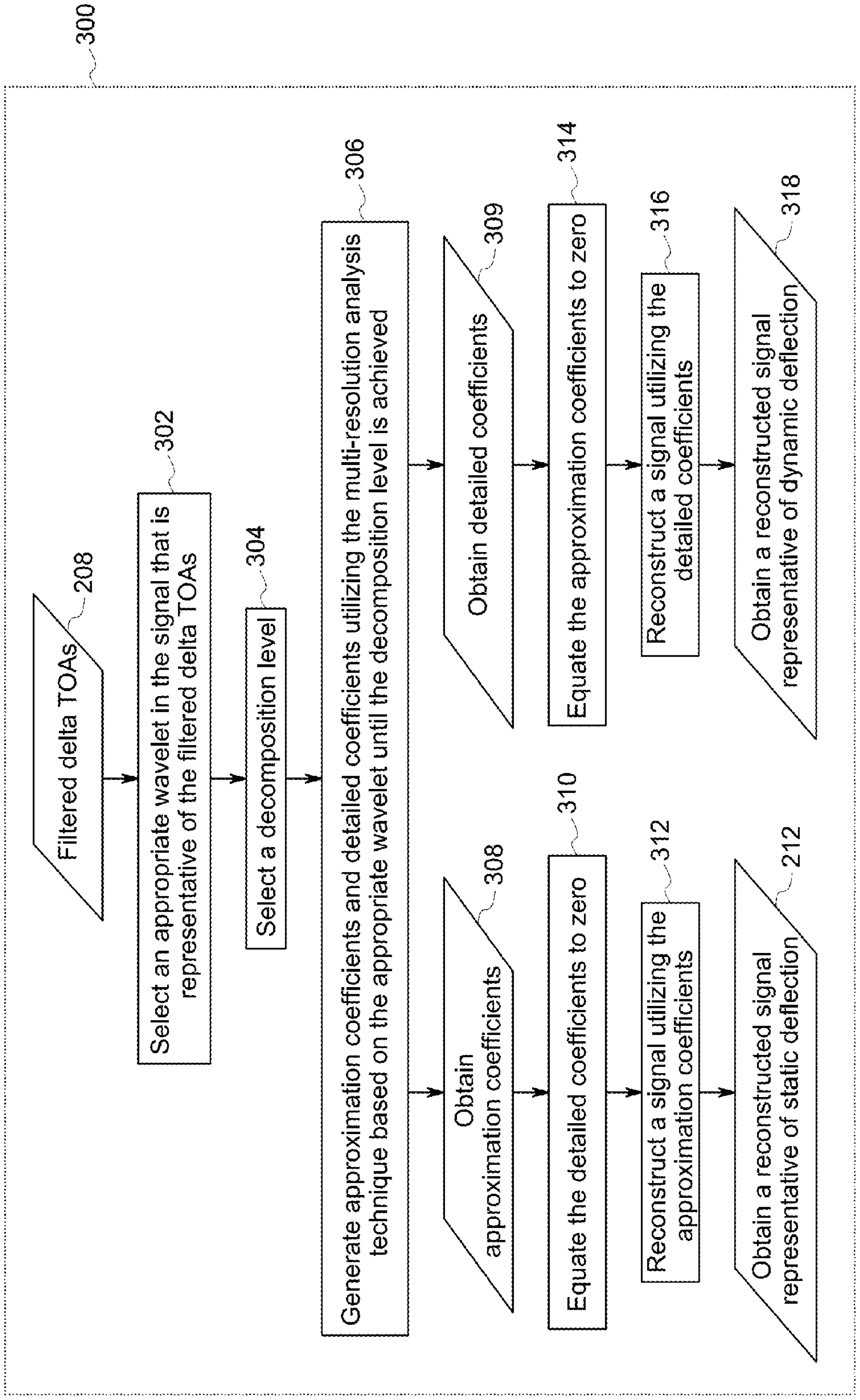
FIG. 3 is a flowchart representing an exemplary method for generating a reconstructed signal representative of at least one of static deflection and dynamic deflection, in accordance with an embodiment of the present techniques.

FIG. 3 is a flowchart representing an exemplary method 300 for generating a reconstructed signal representative of at least one of static deflection and dynamic deflection in accordance with an embodiment of the present techniques. Particularly, FIG. 3 explains step 210 in FIG. 2 in greater detail. Furthermore, in one example, FIG. 3 describes a method for generating a reconstructed signal 318 that is representative of dynamic deflection. At step 302, where an appropriate wavelet based upon the signal that is representative of the filtered delta TOAs 208 is selected. In one embodiment, the appropriate wavelet may be selected by an operator. For example, the appropriate wavelet is an orthogonal wavelet or a biorthogonal wavelet, and has compact support. It is noted that while FIG. 3 shows selection of an appropriate wavelet based upon the signal that is representative of the filtered delta TOAs 208, in one example, the appropriate wavelet is selected based upon a signal that is representative of the delta TOAs.

Subsequently at step 304, a decomposition level is selected in one example. The decomposition level may be selected based upon the filtered delta TOAs 208, signal to noise ratio of the signal representative of the filtered delta TOAs 208, and the like. In certain embodiments, the decomposition level may be selected by an operator based on the length of delta TOA data. Subsequently at step 306, according to one example, approximation coefficients 308 and detailed coefficients 309 are generated until the decomposition level is achieved. The approximation coefficients 308 and the detailed coefficients 309 may be generated utilizing the multi-resolution analysis technique. The generation of the approximation coefficients 308 and the detailed coefficients 309 will be explained in detail with reference to FIG. 4. At step 310, the detailed coefficients 309 that have been generated at step 306 may be equated to zero. Furthermore, at step 312, a signal may be reconstructed utilizing the approximation coefficients 308. Consequent to the reconstruction of the signal at step 312, the reconstructed signal 212 that is representative of static deflection is generated. In alternative embodiments, at step 314, the approximation coefficients 308 may be equated to zero. Furthermore, at step 316, a signal may be reconstructed utilizing the detailed coefficients 309. Consequent to the reconstruction of the signal at step 316, the reconstructed signal 318 that is representative of dynamic deflection is generated.

Figure 4:
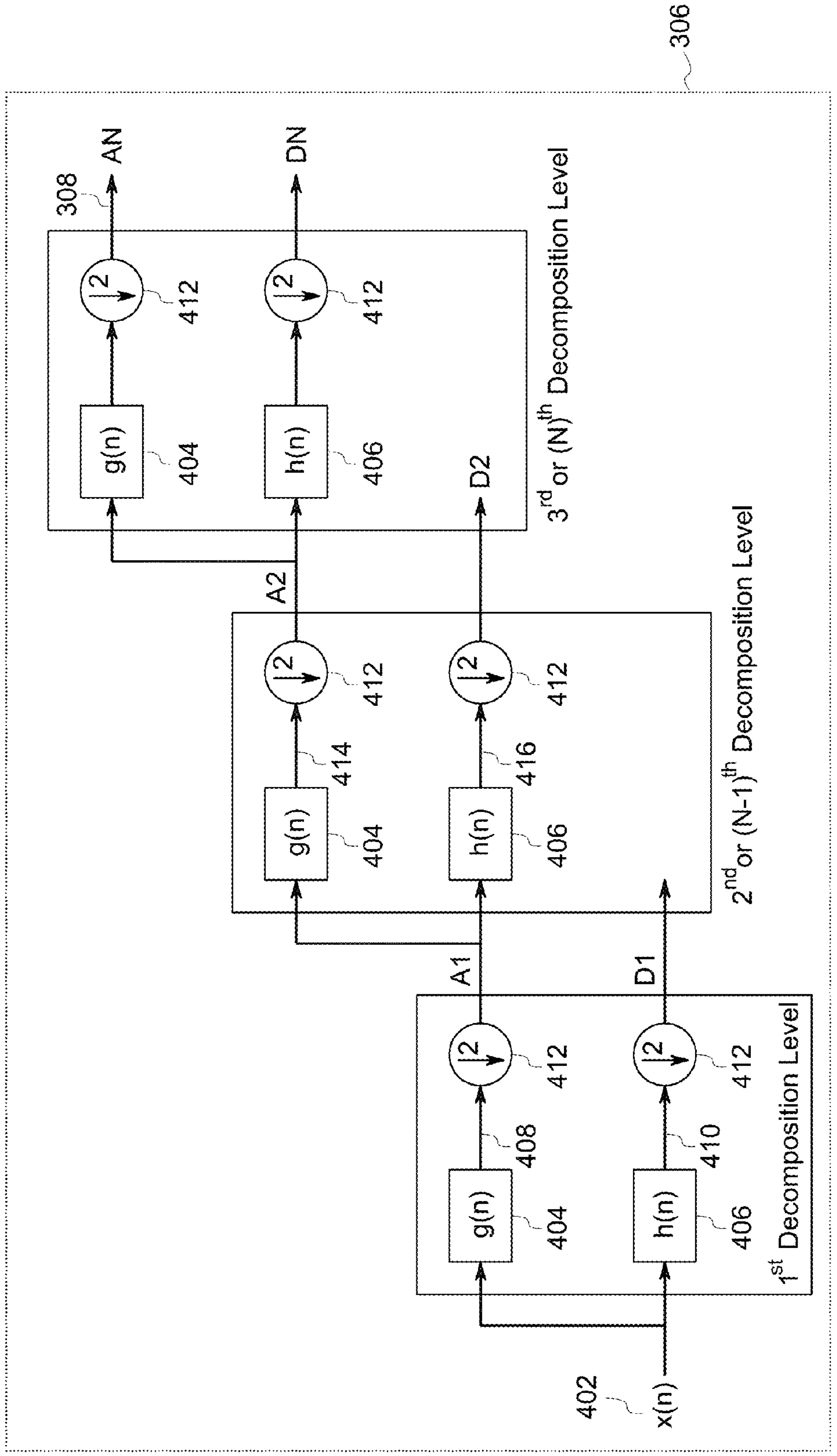
FIG. 4 is a block diagram representing an exemplary analysis technique to generate approximation coefficients and detailed coefficients, in accordance with an embodiment of the present techniques.

FIG. 4 is a block diagram representing an exemplary multi-resolution analysis technique to generate the approximation coefficients 308 (see FIG. 3) and detailed coefficients 309, in accordance with an embodiment of the present techniques. Particularly, FIG. 4 explains step 306 of FIG. 3 in greater detail. In the presently contemplated configuration, reference numeral 402 is representative of a signal x(n) that is representative of the filtered delta TOAs 208, or delta TOAs. In one example, the signal x(n) 402 is decomposed in to low frequencies and high frequencies utilizing a low pass filter g(n) 404 and a high pass filter h(n) 406 until an $N^{th}$ decomposition level is achieved. As previously noted with reference to FIG. 3, the decomposition level M is selected at step 304. In one embodiment, the decomposition level may be selected utilizing the following equation (6):

$$M = \left[\left[\frac{\log(N/P)}{\log 2}\right]\right] \tag{6}$$

where N is the length of filtered delta TOAs or delta TOAs, P is the length of filters g[n] and h[n] and M is a decomposition level. For e.g., if the length of delta TOA data is 20000, and length of the filters g(n) and h(n) is 8, then the value of M is determined as 11. Therefore, in this example, the value of decomposition level is 11. In another embodiment, the decomposition level may be selected from a range of M−4 to M, where M is determined utilizing equation (6). For instance in the above example, the value of decomposition level may vary from 7 to 11. It is noted that the low pass filter g(n) 404 and the high pass filter h(n) 406 are formed based upon the appropriate wavelet that is selected at step 302 in FIG. 3.

As shown in FIG. 4, in a first decomposition level, the signal x(n) 402 is decomposed by passing the signal x(n) 402 through the low pass filter g(n) 404 and high pass filter h(n) 406 to generate coefficients 408 and 410, respectively. Furthermore, the coefficients 408, 410 are down sampled 412 to generate first level approximation coefficients A1 and first level detailed coefficients D1, respectively. Subsequently, in a second decomposition level, the approximation coefficients A1 are passed through the low pass filter g(n) 404 and the high pass filter h(n) 406 to generate coefficients 414, 416, respectively. The coefficients 414, 416 are down sampled 412 to generate second level approximation coefficients A2 and second level detailed coefficients D2, respectively. Similarly, in $N^{th}$ decomposition level $(N-1)^{th}$ approximation coefficients A(N−1) that are generated in $(N-1)^{th}$ decomposition level are passed through the low pass filter g(n) 404 followed by downsampling 412 to generate $N^{th}$ level approximation coefficients AN. Additionally, in $N^{th}$ decomposition level, the $(N-1)^{th}$ level approximation coefficients A(N−1) are passed through the high pass filter h(n) 406 followed by downsampling 412 to generate $N^{th}$ level detailed coefficients D(N). In the presently contemplated configuration, the $(N-1)^{th}$ decomposition level is a second decomposition level and the $N^{th}$ decomposition level is a third decomposition level. In one example, the approximation coefficients A(N) are the approximation coefficients 308, and the detailed coefficients D(N) are the detailed coefficients 309.

Various embodiments described herein provide a tangible and non-transitory machine-readable medium or media having instructions recorded thereon for a processor or computer to operate a system for monitoring health of rotor blades, and perform an embodiment of a method described herein. The medium or media may be any type of CD-ROM, DVD, floppy disk, hard disk, optical disk, flash RAM drive, or other type of computer-readable medium or a combination thereof.

The various embodiments and/or components, for example, the monitor or display, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a floppy disk drive, optical disk drive, and the like. The storage device may also be other similar means for loading computer programs or other instructions into the computer or processor.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from their scope. While the dimensions and types of materials described herein are intended to define the parameters of the various embodiments, they are by no means limiting and are merely exemplary. Many other embodiments will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure. It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method for monitoring the health of a rotating blade, comprising:

selecting an appropriate wavelet based upon a signal representative of delta times of arrival corresponding to a rotating blade;

selecting a final decomposition level;

generating approximation coefficients and detailed coefficients utilizing a multi-resolution analysis technique and said appropriate wavelet until the final decomposition level is achieved;

equating the detailed coefficients to zero; and generating a reconstructed signal from the approximation coefficients;

wherein the reconstructed signal is representative of static deflection in the rotating blade, and wherein the multi-resolution analysis technique comprises a plurality of decomposition levels and each of said decomposition levels comprises at least one low pass filter and at least one high pass filter to generate the approximation coefficients and the detailed coefficients, respectively.

2. The method of claim 1, wherein generating the signal representative of the delta times of arrival comprises:

determining actual times of arrival of the rotating blade;

determining expected time of arrival of the rotating blade; and determining delta times of arrival by subtracting the actual times of arrival from the expected time of arrival.

3. The method of claim 2, wherein the expected time of arrival of the rotating blade is a mean of respective actual times of arrival of one or more rotating blades in a turbine.

4. The method of claim 1, further comprising determining dynamic deflection of the rotating blade by subtracting the reconstructed signal representative of the static deflection from the signal representative of the delta times of arrival.

5. A method for monitoring the health of a rotating blade, comprising:

generating a signal representative of filtered delta times of arrival corresponding to the rotating blade;

selecting an appropriate wavelet based upon the signal representative of the filtered delta times of arrival;

selecting a final decomposition level;

decomposing the signal representative of the filtered delta times of arrival utilizing a multi-resolution analysis technique and the appropriate wavelet until the final decomposition level is achieved to generate approximation coefficients and detailed coefficients; and generating a reconstructed signal utilizing the approximation coefficients, wherein the reconstructed signal is representative of static deflection in the rotating blade, wherein the multi-resolution analysis technique comprises a plurality of decomposition levels and each of said decomposition levels comprises at least one low pass filter and at least one high pass filter to generate the approximation coefficients and the detailed coefficients, respectively.

6. The method of claim 5, further comprising determining a dynamic deflection in the rotating blade by subtracting the reconstructed signal from the signal representative of the filtered delta times of arrival.

7. The method of claim 5, wherein generating the signal representative of the filtered delta times of arrival comprises:

determining actual times of arrival of the rotating blade;

determining expected time of arrival of the rotating blade;

generating a signal representative of delta times of arrival by subtracting each of the actual times of arrival corresponding to the rotating blade from the expected time of arrival; and filtering the delta times of arrival to generate the signal representative of the filtered delta times of arrival.

8. The method of claim 5, wherein the appropriate wavelet is an orthogonal wavelet or a bi-orthogonal wavelet, and has a compact support.

9. The method of claim 5, wherein the decomposition level is selected based upon the filtered delta times of arrival, a signal to noise ratio of the signal representative of the filtered delta times of arrival, and the length of delta times of arrival data.

10. The method of claim 7, wherein the expected time of arrival of the rotating blade is a mean of respective actual times of arrival of one or more rotating blades in a turbine.

11. A system, comprising a processing subsystem that:

generates a signal representative of delta times of arrival corresponding to a rotating blade based upon actual times of arrival of the rotating blade;

selects an appropriate wavelet based upon the signal representative of the delta times of arrival;

selects a final decomposition level;

decomposes the signal representative of the delta times of arrival utilizing a multi-resolution analysis technique and the appropriate wavelet until the final decomposition level is achieved to generate approximation coefficients and detailed coefficients; and generates a reconstructed signal utilizing the approximation coefficients, wherein the reconstructed signal is representative of static deflection in the rotating blade, wherein the multi-resolution analysis technique comprises a plurality of decomposition levels and each of said decomposition levels comprises at least one low pass filter and at least one high pass filter to generate the approximation coefficients and the detailed coefficients, respectively.

12. The system of claim 11 further comprising one or more sensors to generate signals that are representative of the actual times of arrival of the rotating blade.

13. The system of claim 11, further comprising an operator that selects the appropriate wavelet and the decomposition level.

14. The system of claim 11, wherein the appropriate wavelet is an orthogonal wavelet or a bi-orthogonal wavelet, and has a compact support.

15. The system of claim 11, further comprising at least one data repository that stores static deflection, delta times of arrival, actual times of arrival, intermediate results, or combinations thereof.

16. A non-transitory computer readable medium for a blade health monitoring system encoded with a program to instruct a computer to:

generate a signal representative of delta times of arrival corresponding to a plurality of rotating blades based upon actual times of arrival of the plurality of rotating blades;

select an appropriate wavelet in the signal representative of the delta times of arrival;

select a final decomposition level;

decompose the signal representative of the delta times of arrival utilizing a multi-resolution analysis technique and the appropriate wavelet until the final decomposition level is achieved to generate approximation coefficients and detailed coefficients; and generate a reconstructed signal utilizing the approximation coefficients, wherein the reconstructed signal is representative of at least one of static deflection and dynamic deflection in the plurality of rotating blades, wherein the multi-resolution analysis technique comprises a plurality of decomposition levels and each of said decomposition levels comprises at least one low pass filter and at least one high pass filter to generate the approximation coefficients and the detailed coefficients, respectively.

17. A method for monitoring the health of a rotating blade, comprising:

selecting an appropriate wavelet based upon a signal representative of delta times of arrival corresponding to a rotating blade, and selecting a final decomposition level;

generating approximation coefficients and detailed coefficients utilizing a multi-resolution analysis technique and an appropriate wavelet until the final decomposition level is achieved;

equating the approximation coefficients to zero; and generating a reconstructed signal representative of dynamic deflection from the detailed coefficients;

wherein the reconstructed signal is representative of dynamic deflection in the rotating blade, and wherein the multi-resolution analysis technique comprises a plurality of decomposition levels and each of said decomposition levels comprises at least one low pass filter and at least one high pass filter to generate the approximation coefficients and the detailed coefficients, respectively.

* * * * *